United States Patent
Ngai et al.

(10) Patent No.: US 11,169,832 B1
(45) Date of Patent: Nov. 9, 2021

(54) APPARATUS AND METHOD FOR AUGMENTED REALITY USER MANUAL

(71) Applicant: Hong Kong Applied Science and Technology Research Institute Company Limited, Hong Kong (HK)

(72) Inventors: Yat Cheung Ngai, Hong Kong (HK); Yin Yee Chan, Hong Kong (HK)

(73) Assignee: Hong Kong Applied Science and Technology Research Institute Company Limited, Hong Kong (HK)

(*) Notice: Subject to any disclaimer, the term of this patent is extended or adjusted under 35 U.S.C. 154(b) by 0 days.

(21) Appl. No.: 17/321,520

(22) Filed: May 17, 2021

(51) Int. Cl.
  *G06F 3/0481* (2013.01)
  *G06F 9/451* (2018.01)
  *G06T 19/00* (2011.01)

(52) U.S. Cl.
  CPC .......... *G06F 9/453* (2018.02); *G06F 3/04815* (2013.01); *G06T 19/006* (2013.01)

(58) Field of Classification Search
  CPC .... G06F 9/453; G06F 3/04815; G06T 19/006
  See application file for complete search history.

(56) References Cited

U.S. PATENT DOCUMENTS

| | | | |
|---|---|---|---|
| 10,210,662 B2* | 2/2019 | Holzer | G06T 7/55 |
| 10,235,771 B2 | 3/2019 | Rad et al. | |
| 10,373,369 B2* | 8/2019 | Rad | G06K 9/00208 |
| 10,497,179 B2 | 12/2019 | Ngai et al. | |
| 10,540,782 B2 | 1/2020 | Benini et al. | |
| 10,616,483 B1 | 4/2020 | Ngai et al. | |
| 2015/0109339 A1 | 4/2015 | Jin | |
| 2019/0147221 A1* | 5/2019 | Grabner | G06T 7/75 382/103 |
| 2019/0192233 A1 | 6/2019 | O'Grady et al. | |
| 2020/0082626 A1* | 3/2020 | Guo | G06F 3/013 |
| 2020/0234498 A1* | 7/2020 | Price | G06K 9/00671 |
| 2020/0368616 A1* | 11/2020 | Delamont | A63F 13/25 |

FOREIGN PATENT DOCUMENTS

CN  106683196 A  5/2017

OTHER PUBLICATIONS

Yat Cheung Ngai et al., "Apparatus and Method of Three-dimensional Interaction for Augmented Reality Remote Assistance", U.S. Appl. No. 16/820,644, filed Mar. 16, 2020.

* cited by examiner

*Primary Examiner* — Haoshian Shih
(74) *Attorney, Agent, or Firm* — Idea Intellectual Limited; Margaret A. Burke; Sam T. Yip (57) ABSTRACT

A method of generating an AR user manual in an electronic 3D viewing environment, comprising: recording a moving trajectory of the 3D viewing environment's optical sensor; receiving a landmark location information; executing an iterative target object pose estimation comprising: estimating an estimated target object pose from each of the optical sensor poses in the recorded moving trajectory and the landmark location; calculating an estimation error from a 3D model being arranged in the estimated target object pose and projected onto the target object in the real-world scene; calculating a mean of the estimation errors; and reiterating the iterative target object pose estimation to optimize the estimated target object pose for a minimum mean estimation error; if the minimum mean estimation error is within a predefined estimation error threshold, then rendering the AR user manual onto the target object according to the optimized estimated target object pose.

20 Claims, 10 Drawing Sheets

APPARATUS AND METHOD FOR AUGMENTED REALITY USER MANUAL

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to methods and systems for electronic three-dimensional (3D) viewing environment (i.e., augmented reality glasses and goggles) user-interactions and the use of electronic 3D viewing environments for augmented reality applications, particularly the use of augmented user manuals.

BACKGROUND OF THE INVENTION

In many commercial and industrial onsite work scenario, for example installation, maintenance, and troubleshooting of telecommunication and utility equipment, field technicians relied on paper instructions or mobile computing devices like smartphones and laptops displaying online instructions. This typically cumbersome needing to juggle multiple articles in hands while performing the work, not to mention the added difficulty of having to collaborate with other personnel and subject matter experts located afar. The introduction of the augmented reality (AR) viewing devices (i.e., AR glasses, smartphones and tablet computers configured for AR applications) in their fieldwork, real-time intelligence, troubleshooting log, graphics and encrypted data from back-end systems can be streamed and made accessible onsite to the field technicians anytime and anywhere, improving operation speed and quality significantly.

AR user manual takes online user guide to the next level by overlaying texts, images, videos, and/or 3D models with AR technology on objects in the user's viewing scenes, providing instructions to the user in an interactive manner. It is suitable for anyone who can benefit from step-by-step instructions or demonstrations in an interactive manner and it can be used across many different industries and application situations. More specifically, AR user manuals are supported by computer visualization technologies, which superimpose computer-generated images on the users' views of the real-world scenes, offering them mixed virtual-reality viewing experiences allowing better understanding of the instructions and demonstrations.

Figure 1A:
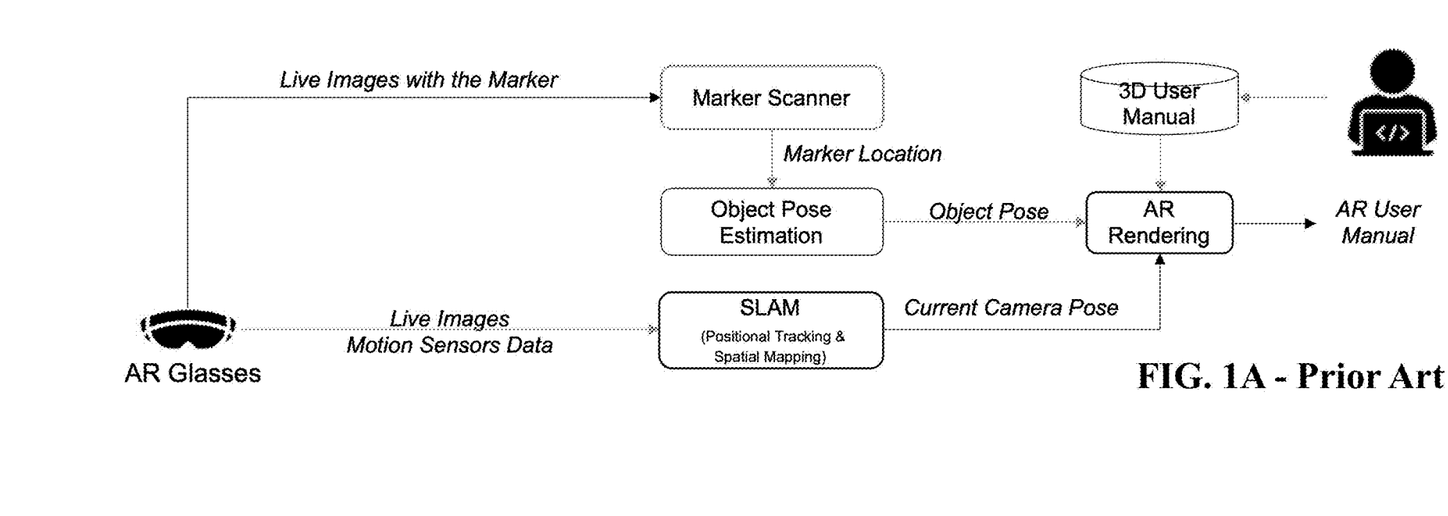
FIG. 1A depicts a schematic diagram illustrating a conventional marker-based approach in providing AR user manual.

Currently, there are two main approaches to AR user manual generation: marker-based approach and artificial intelligence (AI)-based approach. FIG. 1A illustrates the process flow the marker-based approach. Under the marker-based approach, the target object on which an AR user manual is to be superimposed upon is first marked with markers or visual landmarks. The user using a pair of AR glasses first views the target object in the live scene, allowing the AR glasses to capture an image of the target object and scan the markers for object pose estimation. As the user and/or the target object move around in relative to each other, real-time images as viewed through the AR glasses and motion sensors data are captured continuously for simultaneous localization and mapping (SLAM) processing and camera pose tracking. With the estimated object pose and the tracked camera pose, the AR user manual is rendered (overlaid), positioned according to the markers, onto the target object in the live-view displayed by the AR glasses. The short-coming of this approach obviously is the need of first placing markers on the target object, which is impractical in many situations.

Figure 1B:
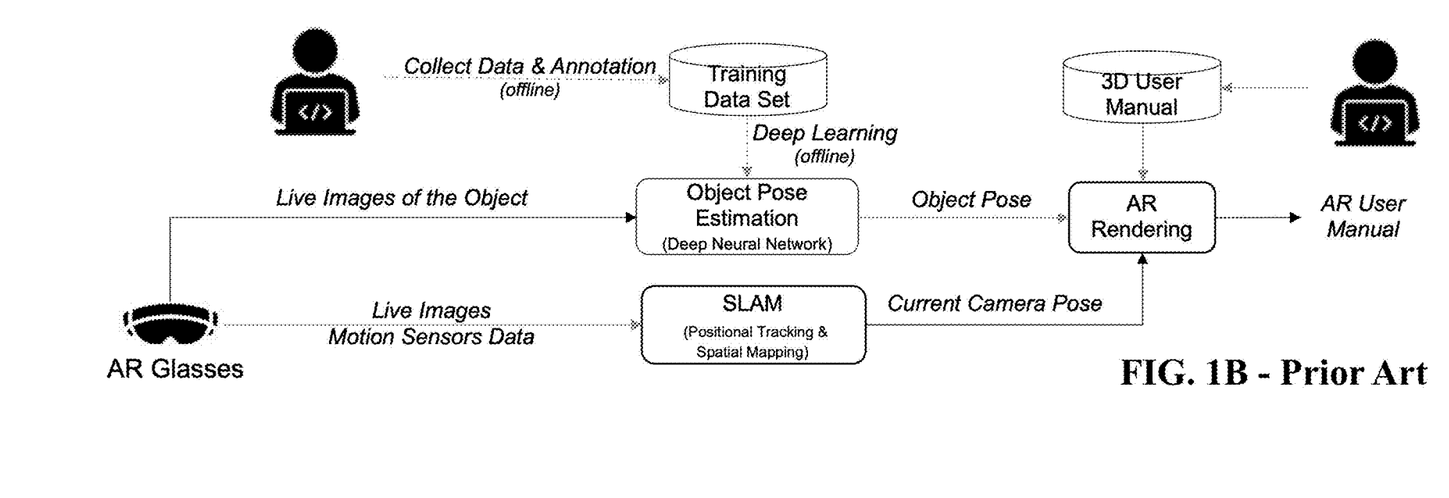
FIG. 1B depicts a schematic diagram illustrating a conventional AI-based approach in providing AR user manual.

FIG. 1B illustrates the process flow the AI-based approach. Under the AI-based approach, a deep learning system, such as one of readily available neural networks, is used to provide the object pose estimation of the target object in the live scene from an image of the target object in the live scene as viewed through the AR glasses by the user. The deep learning system is first trained with a training data set comprising images of objects of the same type as that of the target object with annotation. As the user and/or the target object move around in relative to each other, real-time images as viewed through the AR glasses and motion sensors data are captured continuously for SLAM processing and camera pose tracking. With the AI-estimated object pose and the tracked camera pose, the AR user manual is rendered (overlaid) onto the target object in the live-view displayed by the AR glasses. Typically, such AI-based approaches are computationally intensive; also, the accuracy depends largely on the amount and relevancy of the training data in training the deep learning system. Depending on the types of target objects, the cost or effort of acquiring such training data may be very, if not impractically, high.

SUMMARY OF THE INVENTION

In addressing the aforesaid challenges in the current state of the art, the present invention provides an apparatus and method of generating AR user manuals without the need for pre-set markers and the training for machine learning system. It is also an objective of the present invention to provide such apparatus and method that do not require intensive data computation algorithms.

In accordance to one embodiment of the present invention, provided is a method of generating an AR user manual in an electronic 3D viewing environment, wherein the AR user manual comprises electronic labels, textual and graphical instructions, 2D and 3D models and animations superimposed on to one or more target objects in the electronic 3D viewing environment. In various embodiments, the electronic 3D viewing environment comprises at least an image display or projection system for displaying or projecting argumentation images for viewing by the user, an inside-out optical sensor for capturing images of surrounding real-world scene, and a motion sensor for tracking the position and orientation (pose) of the inside-out optical sensor. The electronic 3D viewing environment is configured to allow its user to view her surrounding real-world scene with 3D argumentations displayed or projected (superimposed in the surrounding real-world scene) simultaneously; and continuously record, during use, the moving trajectory of the inside-out optical sensor. In one implementation, the electronic 3D viewing environment is a pair of AR glasses or goggles.

The method starts with the electronic 3D viewing environment initiating positional tracking and orientation recording of its optical sensor. A moving trajectory, which comprises a plurality of optical sensor poses (or motions), is continuously recorded until a calibration process is completed. The calibration process comprises: displaying to the user of the electronic 3D viewing environment a predefined 3D model of a target object as a cue, wherein the 3D model has a landmark on it, and the display of the 3D model can be done by a separate electronic image display device or the electronic 3D viewing environment via its image display or projection system; prompting the user to find the target object in the surrounding real-world scene as viewed through the electronic 3D viewing environment, and locate and indicate the location of the landmark on the target object; and recording, as viewed through and captured by the electronic 3D viewing environment, the position of the landmark as indicated by the user.

The method continues with an iterative estimation of the position and orientation (pose) of the target object in the surrounding real-world scene as viewed through and captured by the electronic 3D viewing environment for each optical sensor pose in the recorded moving trajectory. The iterative target object pose estimation comprises: estimating, by adjusting the values of one or more estimation parameters, an estimated pose of the target object in the surrounding real-world scene from the current optical sensor pose and the location of the landmark on the target object as indicated by the user during the calibration process; for each optical sensor pose in the moving trajectory, generating an image of interest in which the 3D model is arranged in the estimated target object pose and projected (superimposed) onto the target object in the surrounding real-world scene; using each image of interest generated and based on the corresponding optical sensor pose, determining the 3D data points of the surrounding real-world scene and 3D data points of the projected 3D model using ray-casting and a spatial mapping system; calculating a target object pose estimation error from the 3D data points of the surrounding real-world scene and the corresponding 3D data points of the projected 3D model; qualifying the optical sensor pose; calculating a mean of the target object pose estimation errors corresponding to the qualified optical sensor poses; reiterating the estimation steps of the target object pose with one or more of the estimation parameter values adjusted until an optimized estimated target object pose is found that produces a minimum of the target object pose mean estimation error; and comparing the minimum target object pose mean estimation error with a predefined target object pose mean estimation error threshold.

Finally, if the minimum target object pose mean estimation error does not exceed the predefined target object pose mean estimation error threshold, the method proceeds to rendering a 3D user manual comprising superimposing the 3D user manual onto the target object in the electronic 3D viewing environment according to the optimized estimated target object pose and the current optical sensor pose.

BRIEF DESCRIPTION OF THE DRAWINGS

Embodiments of the invention are described in more detail hereinafter with reference to the drawings, in which.

DETAILED DESCRIPTION

In the following description, apparatuses and methods for providing AR user manuals in electronic 3D viewing environments, and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In accordance to one embodiment of the present invention, provided is a method of generating an AR user manual in an electronic 3D viewing environment, wherein the AR user manual comprises electronic labels, textual and graphical instructions, 2D and 3D models and animations superimposed on to one or more target objects in the electronic 3D viewing environment. In various embodiments, the electronic 3D viewing environment comprises at least an image display or projection system for displaying or projecting argumentation images for viewing by the user, an inside-out optical sensor for capturing images of surrounding real-world scene, a motion sensor for tracking the position and orientation (pose) of the inside-out optical sensor, and a 3D spatial mapping system for generating 3D spatial maps. The electronic 3D viewing environment is configured to allow its user to view her surrounding real-world scene with 3D argumentations displayed or projected (superimposed in the surrounding real-world scene) simultaneously; and continuously record, during use, the moving trajectory of the inside-out optical sensor using the motion sensor, which comprises a plurality of optical sensor poses (or motions), using the motion sensor. In one implementation, the electronic 3D viewing environment is a pair of AR glasses or goggles.

Figure 2A:
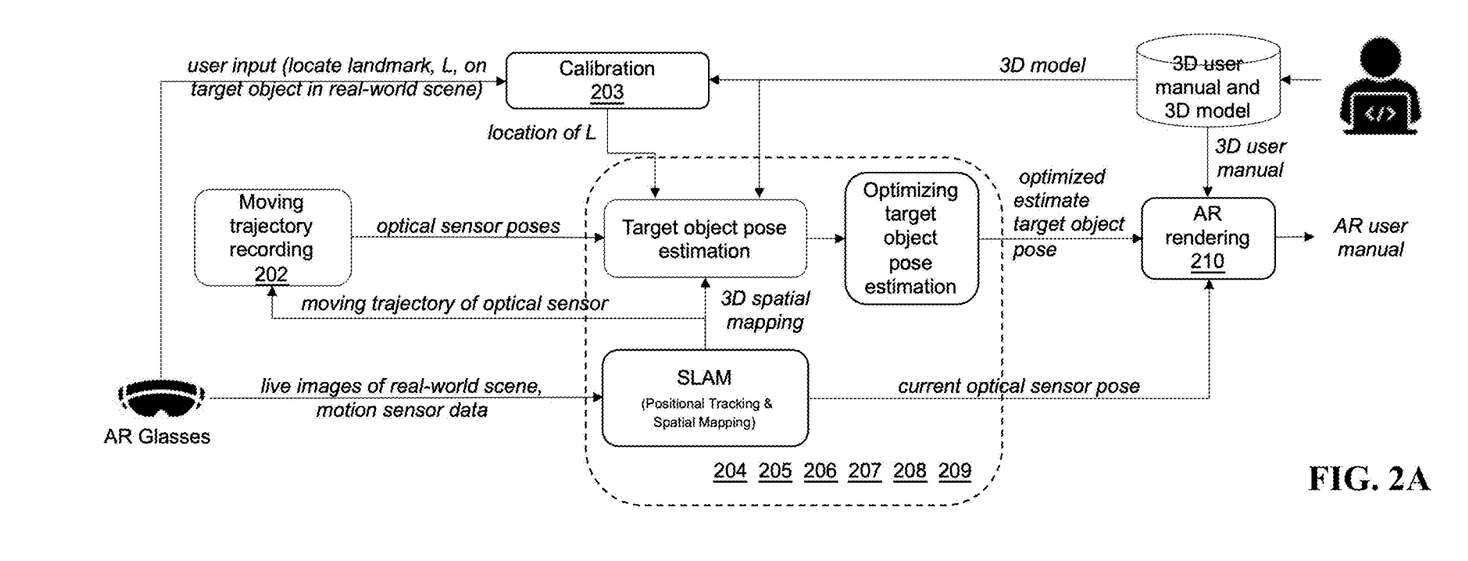
FIG. 2A depicts a schematic diagram illustrating a method for providing AR user manuals in an electronic 3D viewing environment in accordance to various embodiments of the present invention.
Figure 2B:
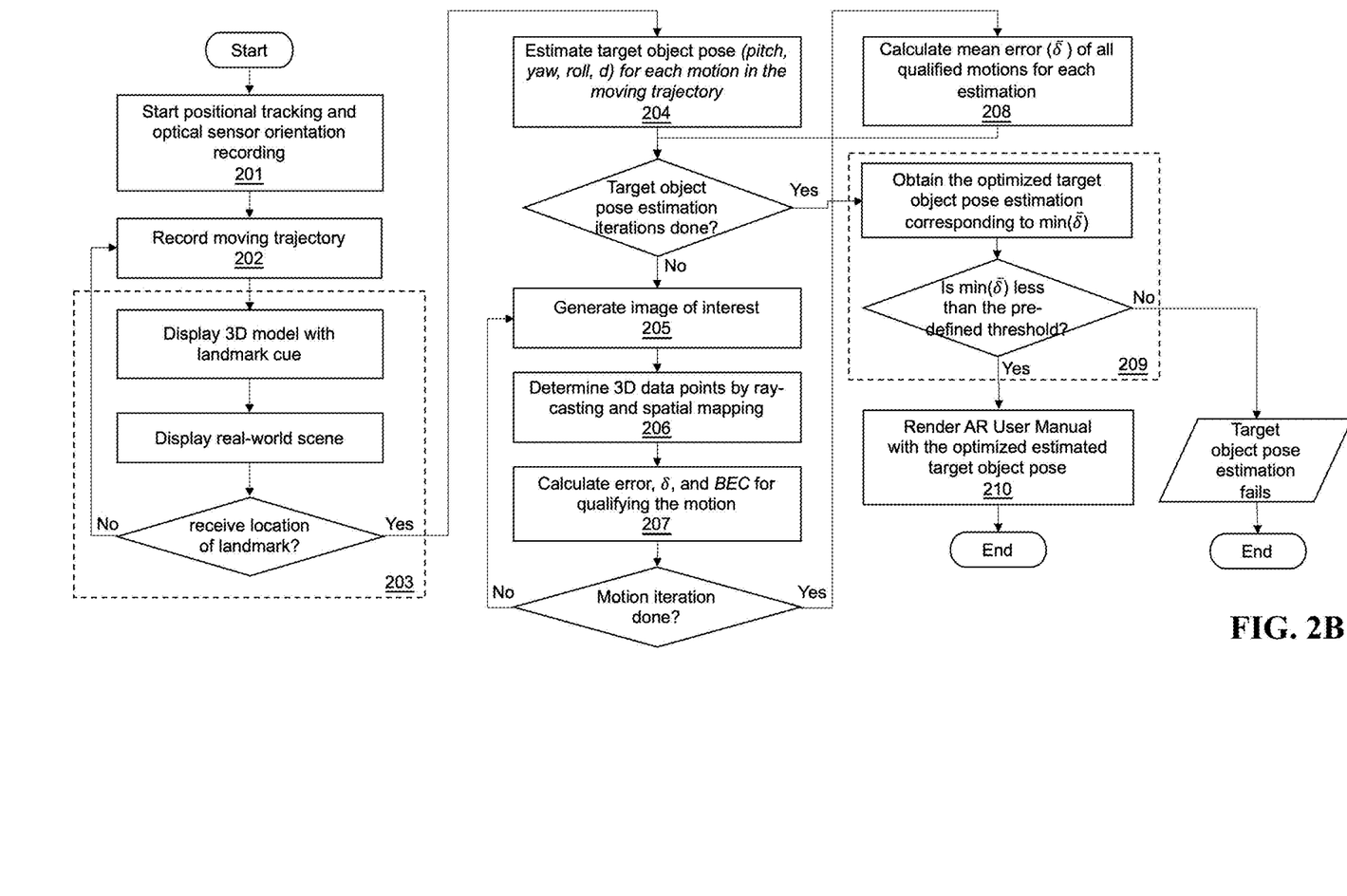
FIG. 2B depicts a flowchart of the method for providing AR user manuals in the electronic 3D viewing environment.
Figure 3:
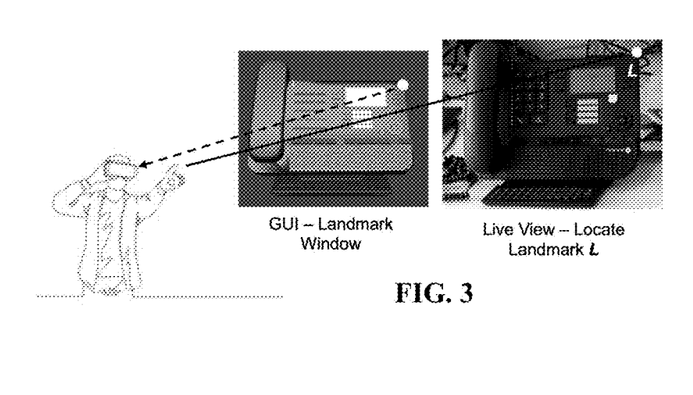
FIG. 3 illustrates a part of a calibration process, which includes displaying a predefined 3D model of a target object having a landmark on it to a user and prompting the user to find the target object in the surrounding real-world scene and locate the landmark as viewed through the electronic 3D viewing environment in accordance to one embodiment of the present invention.

Referring to FIGS. 2A and 2B. The method starts with (201) the electronic 3D viewing environment initiating positional tracking and orientation recording of its optical sensor. (202) A moving trajectory, which comprises a plurality of optical sensor poses (or motions), is continuously recorded until a (203) calibration process, which calibrates an initial projection (superimposition) of a predefined 3D model of a target object in the surrounding real-world scene, is completed. The (203) calibration process comprises: displaying to the user of the electronic 3D viewing environment the 3D model with an indicator of a landmark on it as a cue (as illustrated in the left image of FIG. 3), wherein the display of the 3D model can be done by a separate electronic image display device or the electronic 3D viewing environment via its image display or projection system; prompting the user to find the target object in the surrounding real-world scene as viewed through the electronic 3D viewing environment, and locate and indicate the position of the landmark on the target object (as illustrated in the right image of FIG. 3); and recording, as viewed through and captured by the electronic 3D viewing environment, the spatial coordinate of the location of the landmark as indicated by the user.

The method continues with an iterative estimation of the position and orientation (pose) of the target object in the surrounding real-world scene as viewed through and captured by the electronic 3D viewing environment. The iterative target object pose estimation comprises: for each optical sensor pose (or motion) in the moving trajectory, (204) estimating, by adjusting the values of one or more estimation parameters, a pose of the target object in the surrounding real-world scene from the optical sensor pose and the location of the landmark on the target object as indicated by the user during the calibration process; for each optical sensor pose, (205) generating an image of interest in which the 3D model is arranged in the estimated target object pose and projected (superimposed) onto the target object in the surrounding real-world scene, initially with the location of the landmark on the 3D model aligned with the location of the landmark on the target object as indicated by the user; for each image of interest, (206) determining the 3D data points of the surrounding real-world scene and 3D data points of the projected 3D model using ray-casting and a spatial mapping system; (207) calculating a target object pose estimation error from the 3D data points of the surrounding real-world scene and the corresponding 3D data points of the projected 3D model, and qualifying the optical sensor pose; repeating steps 205 to 207 for all optical sensor poses in the moving trajectory to obtain the target object pose estimation errors corresponding to the qualified optical sensor poses; (208) calculating a mean estimation error of the target object pose estimation errors corresponding to the qualified optical sensor poses; reiterating the target object pose estimation steps 204 to 208 with one or more of the estimation parameter values adjusted in each iteration until an optimized estimated target object pose is found that produces a minimum of the target object pose mean estimation error; and (209) comparing the minimum target object pose mean estimation error with a predefined target object pose mean estimation error threshold.

Finally, if the minimum target object pose mean estimation error does not exceed the predefined target object pose mean estimation error threshold, the method proceeds to (210) rendering a 3D user manual comprising superimposing (or projecting) the 3D user manual onto the target object in the electronic 3D viewing environment according to the optimized estimated target object pose and the current optical sensor pose.

Optionally, the superimposing of the 3D user manual can be precisely onto the target object at a point of interest. The point of interest is predefined along with the 3D model definition, and the location of the point of interest on the target object is determined according to the optimized estimated target object pose and the current optical sensor pose.

In accordance to another embodiment, a content creation method is also provided, which comprises: providing a content creation user interface for defining the 3D model, the landmark, and a point of interest for rendering the AR user manual; receiving a 1:1 real object 3D model data using the content creation user interface; receiving coordinate data of the location of the landmark on the 3D model using the content creation user interface; and optionally receiving coordinate data of a point of interest on the 3D mode using the content creation user interface.

Figure 4:
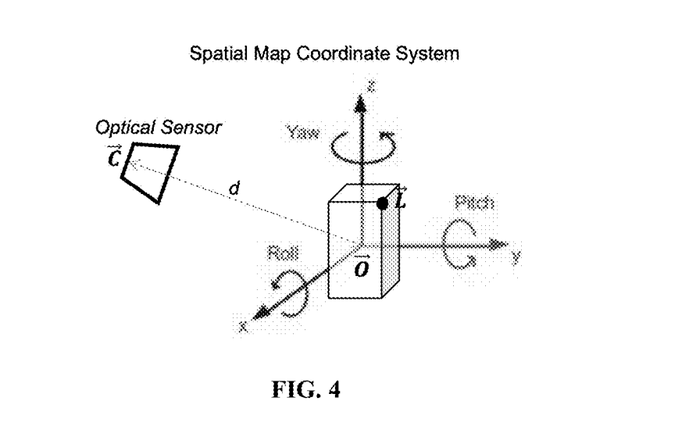
FIG. 4 illustrates a computation of an estimated pose of the target object in the surrounding real-world scene as viewed through the electronic 3D viewing environment in a target object pose estimation process in accordance to one embodiment of the present invention.

Referring to FIG. 4 for an illustration of the estimation of the target object pose in one estimation iteration. In accordance to one embodiment, the estimation comprises: estimating a pitch of the target object about its center, $\vec{O}$; estimating a roll of the target object about $\vec{O}$; estimating a yaw of the target object about $\vec{O}$; and estimating a distance, d, from the optical sensor lens, $\vec{C}$, to $\vec{O}$. $\vec{O}$ and d are found by calculating:

$$\vec{O}_{init} = \vec{L} + \vec{LO};$$

$$\vec{O} = \vec{C} + d\vec{CO}_{init};$$

$$d = |\vec{CO}_{init}| + l;$$

where $\vec{LO}$ is a spatial vector from the center of the predefined 3D model to the landmark on the 3D model; $\vec{L}$ is the spatial coordinate of the landmark in the surrounding real-world scene as located and indicated by the user during the calibration process; and l is a distance compensation for the difference in the distance between the optical sensor lens and the target object center being used in the current target object pose estimation iteration and distance between the optical sensor lens and the target object center during the calibration process. The estimated target object pose is then represented by {pitch, yaw, roll, d}.

In accordance to one embodiment, pitch and roll are fixed to 0° or +/−90° during the calibration process for the target object pose estimation for the target object is assumed to be placed upright or horizontally. yaw is opposite of the optical sensor yaw of optical sensor pose because in most cases the user (in turn the optical sensor) is facing toward the target object, and, yaw is a varying target object pose estimation parameter which value may be varied between +90° to −90°. As another varying target object pose estimation parameter, the value of l may be varied within a configurable length value range of −4 cm to +4 cm.

Figure 5:
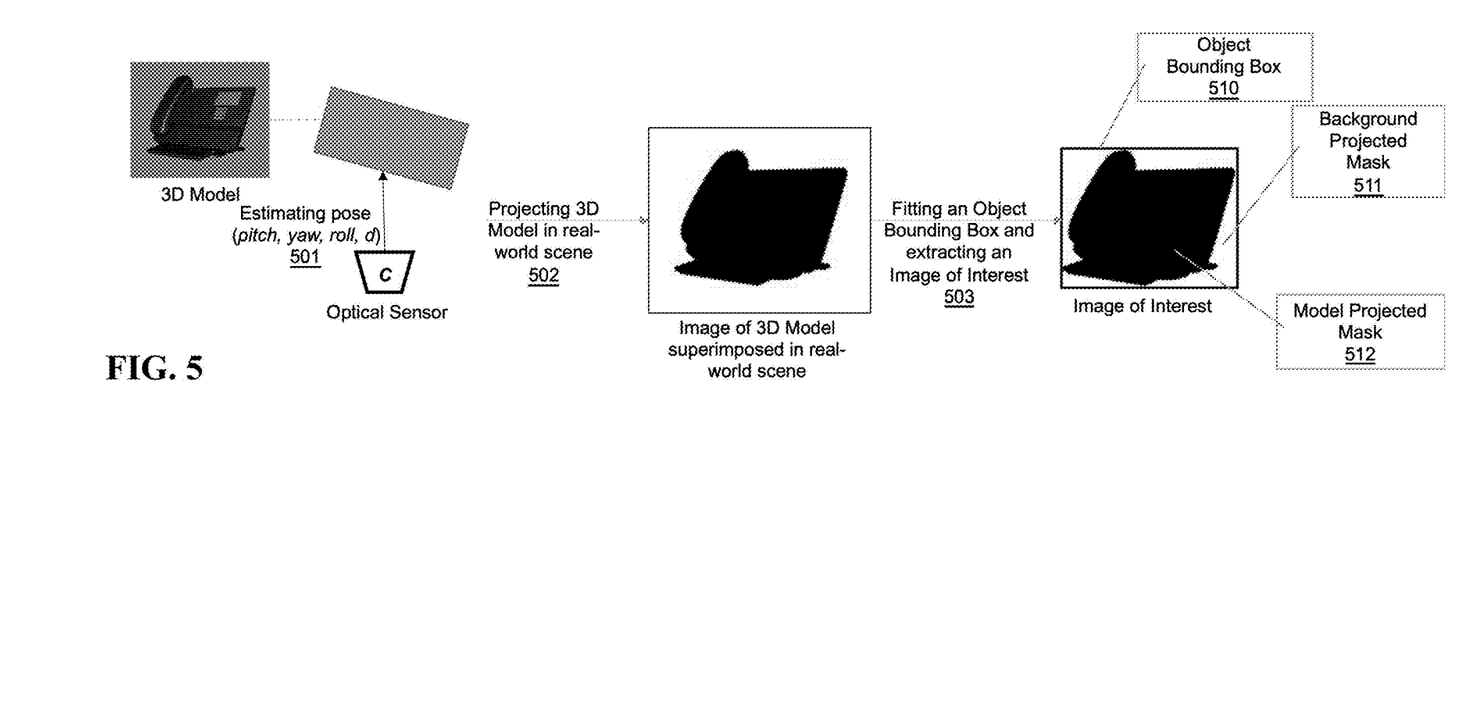
FIG. 5 illustrates a generation of an image of interest in the target object pose estimation in accordance to one embodiment of the present invention.

Referring to FIG. 5 for an illustration of the generation of the image of interest. The generation comprises: (501) estimating the target object pose from the optical sensor pose and the location of the landmark on the target object as described above; (502) projecting (superimposing) the 3D model, which is arranged to the estimated target object pose, onto the target object in the surrounding real-world scene, that is, projecting the 3D model onto the image plane of the optical sensor; (503) fitting an object bounding box (510) around the 3D model-projected target object; and extracting an image of interest capturing the view bounded by the object bounding box (510).

Figure 6:
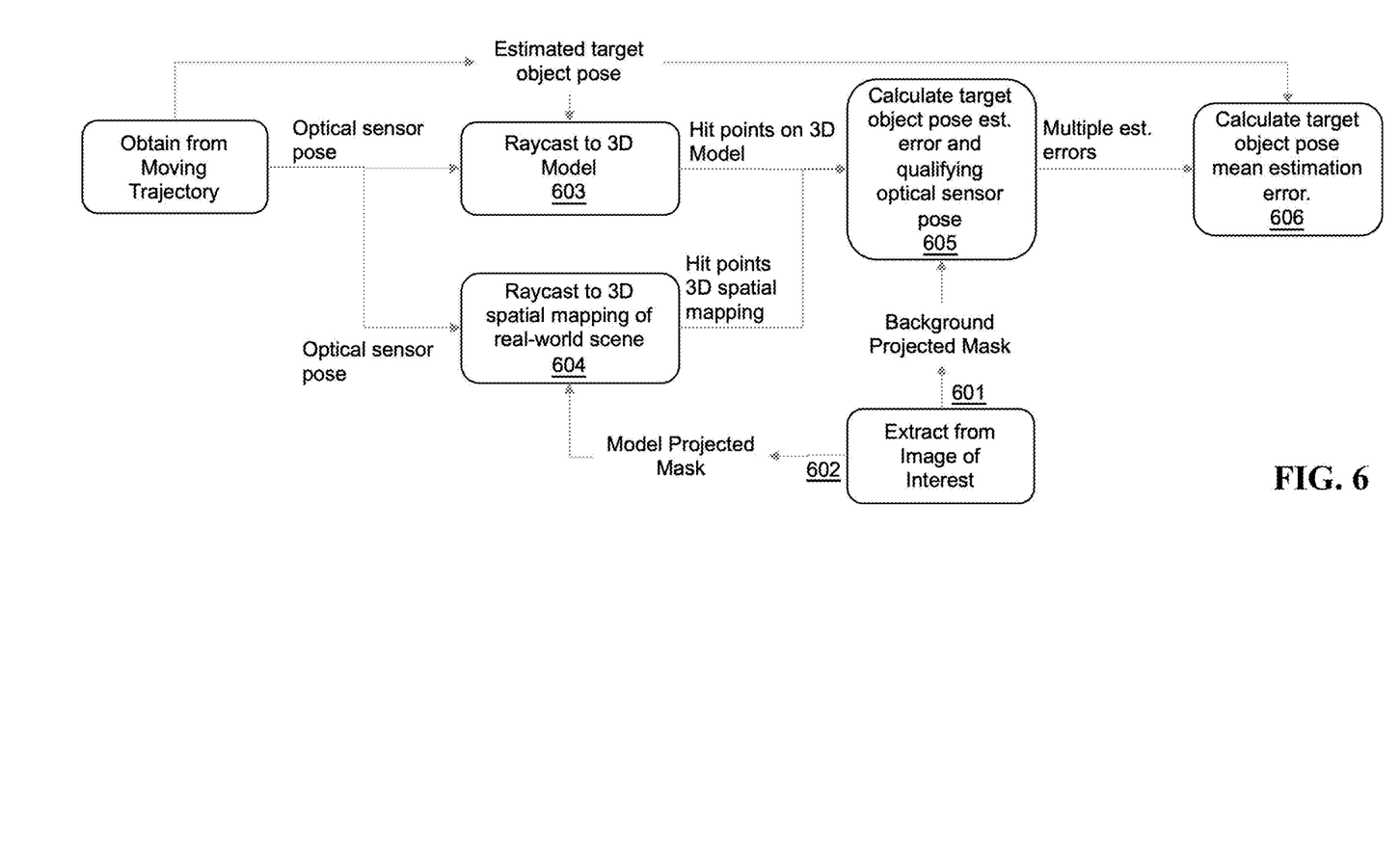
FIG. 6 illustrates a generation of a determination of 3D data points of the surrounding real-world scene and 3D data points of the 3D model, and calculation of estimation error in the target object pose estimation in accordance to one embodiment of the present invention.

Referring to FIG. 6 for an illustration of the determination of 3D data points of the surrounding real-world scene and 3D data points of the projected 3D model and calculation of estimation error in the iterative estimation of the target object pose. The determination comprises: (601) extracting a background projected mask (511) from area(s) between the object bounding box (510) and the 3D model-projected target object impression outline in the image of interest; (602) extracting a model projected mask (512) from the 3D model-projected target object impression in the image of interest; for each optical sensor pose in the moving trajectory, (603) performing a Ray-cast operation to obtain the hit point of each ray from the optical sensor pose through each pixel, $p_i$, in the model projected mask to the 3D model arranged in the estimated target object pose superimposed in the surrounding real-world scene to obtain the 3D data points of the projected 3D model, and (604) performing a Ray-cast operation to obtain the hit point of each ray from the optical sensor pose through each pixel, $p_i$, in the model projected mask to a 3D spatial mapping of the surrounding real-world scene to obtain the 3D data points of the surrounding real-world scene, wherein the 3D spatial mapping is generated by a spatial mapping system (i.e. a SLAM system); (605) calculating the target object pose estimation error and qualifying the optical sensor pose; and (606) calculating an target object pose mean estimation error.

Figure 7A:
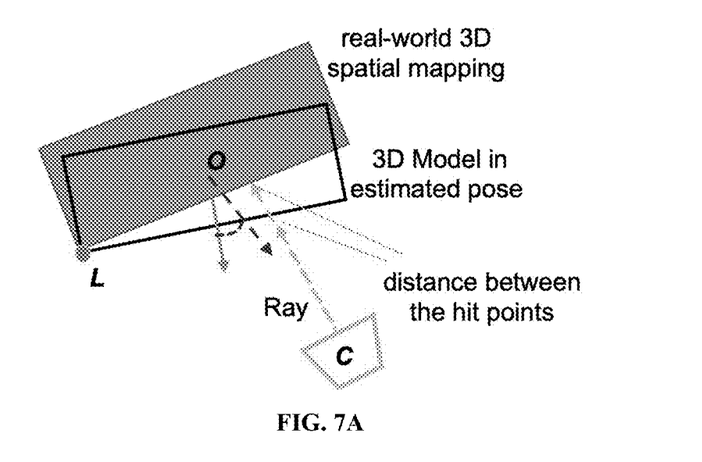
FIG. 7A illustrates the calculation of a target object pose estimation error in accordance to one embodiment of the present invention.

The calculation of the target object pose estimation error is illustrated by FIG. 7A. In the calculation of the target object pose estimation error, for each pixel, $p_i$, in the model projected mask, the estimation pixel error, $\epsilon$, of the 3D model in the estimated target object pose is calculated by:

$$\epsilon(p_i) = \|\text{Raycast}(p_i, M) - \text{Raycast}(p_i, S)\|;$$

where:
M is the spatial coordinate matrix of the 3D model arranged in the estimated target object pose;
S is the spatial coordinate matrix of the 3D spatial mapping of the surrounding real-world scene;
Raycast($p_i$, M) is spatial coordinate of the hit point of a ray from the optical sensor pose through the pixel, $p_i$, in the model projected mask to the 3D model arranged in the estimated target object pose superimposed in the surrounding real-world scene;
Raycast($p_i$, S) is spatial coordinate of the hit point of a ray from the optical sensor pose through the pixel, $p_i$, in the model projected mask to the 3D spatial mapping of the surrounding real-world scene; and
the estimation pixel error of $p_i$, $\epsilon(p_i)$, is the spatial distance between Raycast($p_i$, M) and Raycast($p_i$, S).

The target object pose estimation error, $\delta$, is then the mean of estimation pixel errors of all pixels in the model projected mask, and it can be calculated by:

$$\delta = 1/n \Sigma_{i=0}^{n-1} \epsilon(p_i)$$

where n is the number of pixels in the model projected mask.

Figure 7B:
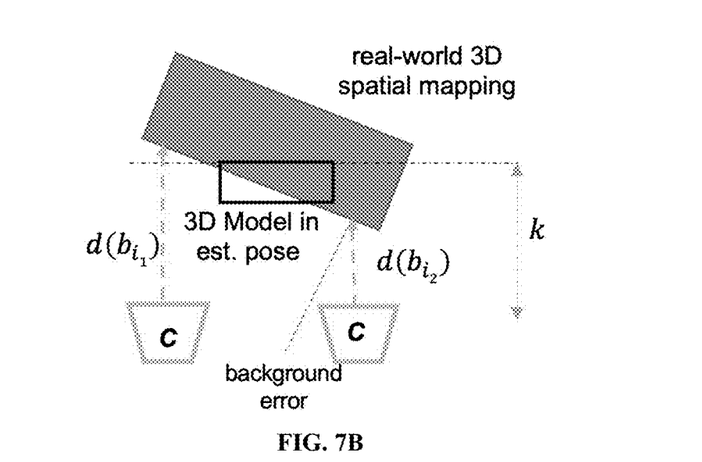
FIG. 7B illustrates the determination of background error in the target object pose estimation in accordance to one embodiment of the present invention.

Referring to FIG. 7B. The hit point of each ray through each pixel, $b_i$, in the background projected mask to the 3D spatial mapping of the surrounding real-world scene is expected to be farther than any hit point of a ray through the model projected mask. It is because from the point of view of the optical sensor, the target object, if visible, should be closer to the optical sensor than the background of the surrounding real-world scene; thus, the 3D model arranged in an accurate pose and superimposed in the surrounding real-world scene should not appear to be farther than or behind the background or any feature of the surrounding real-world scene unless the view of the target object is obstructed by other object.

Figure 7C:
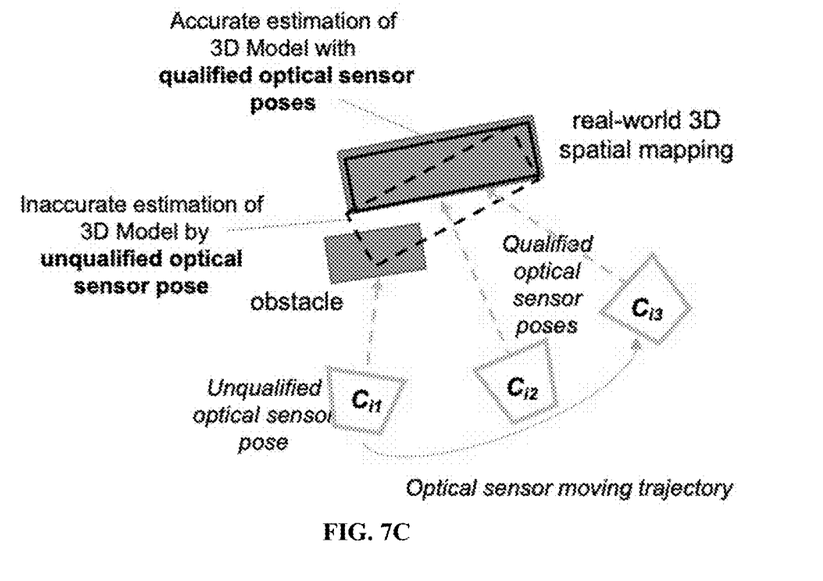
FIG. 7C illustrates the disqualification of optical sensor pose in the target object pose estimation in accordance to one embodiment of the present invention.

Therefore, to account for the condition—background error, in which the view of the target object is obstructed by other object under certain optical sensor pose(s) in the moving trajectory, those optical sensor pose(s) are to be disqualified or removed from the target object pose estimation process. In another word, the qualification of the optical sensor pose comprises the determination of existence of background error for the optical sensor pose. In the determination of background error, a background error count, BEC, is defined, and a distance, k, between the optical sensor lens and the farthest point (pixel) of the 3D model is obtained for the optical sensor pose. For every hit point of a ray through $b_i$ to the 3D spatial mapping of the surrounding real-world scene having a distance from the optical sensor lens, $d(b_i)$, that is shorter than k, BEC is incremented. That is, for each pixel, $b_i$, in the background projected mask, and the distance from the optical sensor lens through $b_i$ to the hit point of a ray, $d(b_i)$, if $d(b_i)<k$, BEC=BEC+1. After all pixels in the background projected mask are accounted for, if the total BEC is larger than a predefined background error count threshold, the background error exists for the optical sensor pose, the optical sensor pose obtained from the moving trajectory is considered disqualified and removed from the target object pose estimation process, and the estimated target object pose based on the disqualified optical sensor pose is discarded. This is illustrated in FIG. 7C.

The calculation of the target object pose mean estimation error, $\bar{\delta}$, comprises calculating a mean of N number of the target object pose estimation errors corresponding to the N number of qualified optical sensor poses obtained in the computation in the current iteration of estimation of target object pose; that is: $\bar{\delta} = 1/N \Sigma_{j=0}^{N-1} \delta_j$.

Having obtained the target object pose mean estimation error, $\bar{\delta}$, of the current iteration of target object pose estimation, the afore-described target object pose estimation steps are reiterated with the values of the estimation parameters adjusted in each iteration for finding an optimized estimated target object pose that produces the minimum target object pose mean estimation error, min($\bar{\delta}$). The estimation parameters, according to one embodiment, comprise the yaw of the target object and the optical sensor lens-target object center distance compensation, l. That is, in each iteration, yaw and/are adjusted for finding the N number of the target object pose estimation errors corresponding to the N number of qualified optical sensor poses that minimize the target object pose mean estimation pose error, $\bar{\delta}$; and the optimized yaw value, $\text{yaw}_{opt}$, and optimized l value, $l_{opt}$, that minimize $\bar{\delta}$ contribute to the optimized estimated target object pose, {pitch, $\text{yaw}_{opt}$, roll, $d_{opt}$}, where $d_{opt} = |\overrightarrow{CO_{init}}| + l_{opt}$.

Finally, if no optical sensor pose is found to be qualified in the iterative estimation of target object pose; or if the minimum target object pose mean estimation error, min($\bar{\delta}$), is larger than the predefined target object pose mean estimation error threshold, the iterative estimation of target object pose is considered to be a failure and the user is notified as such.

Figure 8:
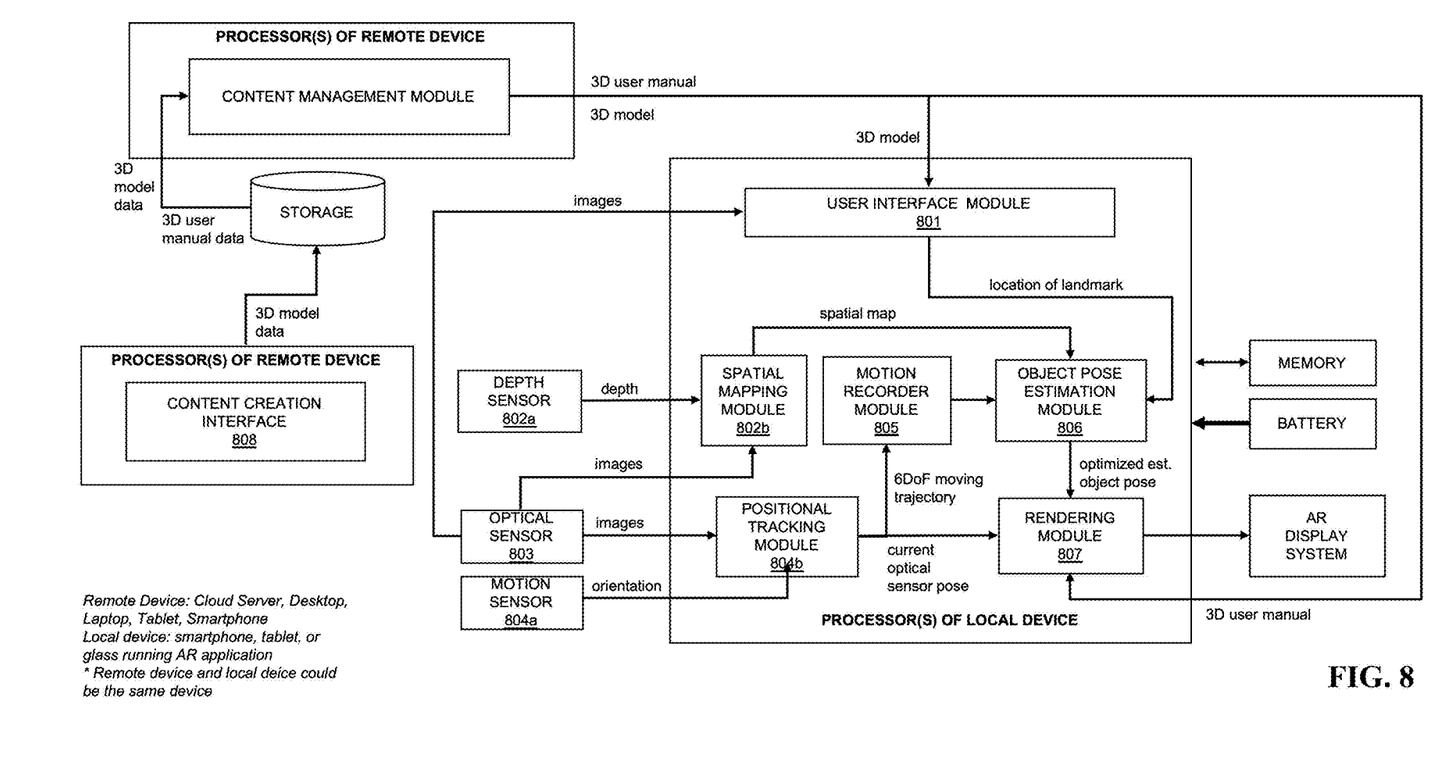
FIG. 8 depicts a logical block diagram of an apparatus for providing AR user manuals in an electronic 3D viewing environment in accordance to various embodiments of the present invention.

Referring to FIG. 8 for illustrating an apparatus for generating an AR user manual in an electronic 3D viewing environment for viewing a surrounding real-world scene with the AR user manual in accordance to various embodiments of the present invention.

The apparatus comprises: an optical sensor (803) configured to capture images of the surrounding real-world scene; a spatial mapping system comprising a depth sensor (802a) and a spatial mapping module (802b) implementable by one or more processors, the spatial mapping system configured to generate a 3D spatial mapping of the surrounding real-world scene; and a position tracking module (804b) implementable by one or more processors and configured to receive orientation data from a motion sensor (804a) of the optical sensor (803) and generate a moving trajectory of the optical sensor comprising a plurality of optical sensor poses.

The apparatus further comprises a user interface module (801) implementable by one or more processors and configured to execute a calibration of an initial projection of a predefined 3D model of a target object in the surrounding real-world scene, the calibration comprising: receiving information of a location of a landmark on the target object in the surrounding real-world scene, wherein the landmark on the target object corresponds to a landmark on the 3D model.

The apparatus further comprises a motion recorder module (805) configured to record the moving trajectory.

The apparatus further comprises an object pose estimation module (806) implementable by one or more processors and configured to: execute an iterative target object pose estimation, comprising: estimating, by adjusting the values of one or more estimation parameters, an estimated pose of the target object in the surrounding real-world scene from the current optical sensor pose and the location of the landmark on the target object; for each of the optical sensor poses in the moving trajectory, generating an image of interest in which the 3D model is arranged in the estimated target object pose and projected onto the target object in the surrounding real-world scene; using each image of interest generated and based on the corresponding optical sensor pose, determining the 3D data points of the surrounding real-world scene and 3D data points of the projected 3D model using ray-casting and a spatial mapping system; calculating a target object pose estimation error from the 3D data points of the surrounding real-world scene and the corresponding 3D data points of the projected 3D model; qualifying the optical sensor pose; calculating a mean of the target object pose estimation errors corresponding to the qualified optical sensor poses; reiterating the estimation steps of the target object pose with one or more of the estimation parameter values adjusted until an optimized estimated target object pose is found that produces a minimum of the target object pose mean estimation error; and comparing the minimum target object pose mean estimation error with a predefined target object pose mean estimation error threshold.

The apparatus further comprises a rendering module (807) implementable by one or more processors and configured to render the AR user manual onto the target object in the electronic 3D viewing environment according to the optimized estimated target object pose and the current optical sensor pose if the minimum target object pose mean estimation error does not exceed the predefined target object pose mean estimation error threshold.

Optionally, the rendering module (807) is further configured to project the AR user manual onto a point of interest on the target object according to the optimized estimated target object pose and the current optical sensor pose; and remove the 3D model projection from the electronic 3D viewing environment.

In accordance to another embodiment, the apparatus further comprises a content creation interface (808) for defining the 3D model, the landmark, and a point of interest for rendering the AR user manual, the content creation user interface is configured to receive a 1:1 real object 3D model data using the content creation user interface; receive coordinate data of the location of the landmark on the 3D model using the content creation user interface; and receive coordinate data of a point of interest on the 3D mode using the content creation user interface.

The embodiments disclosed herein may be implemented using one or more computing devices, computer processors, or electronic circuitries including but not limited to application specific integrated circuits (ASIC), field programmable gate arrays (FPGA), and other programmable logic devices specially configured or programmed according to the teachings of the present disclosure. Machine instructions executing in and/or electronic circuitry configurations in the computing devices, computer processors, or programmable logic devices can readily be prepared by practitioners skilled in the computer and electronic art based on the teachings of the present disclosure.

The aforesaid computing devices, computer processors, or electronic circuitries may be incorporated in one or more server computers, personal computers, laptop computers, mobile computing devices such as smartphones and tablet computers.

The electronic embodiments include transient and non-transient electronic storage media having machine instructions and/or electronic circuitry configuration data stored therein which can be used to configured computing devices, computer processors, or electronic circuitries to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Various embodiments of the present invention also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method of generating an augmented reality (AR) user manual in an electronic three-dimensional (3D) viewing environment for viewing a surrounding real-world scene with the AR user manual, comprising:
   recording a moving trajectory of an inside-out optical sensor of the 3D viewing environment, wherein the moving trajectory comprises a plurality of optical sensor poses;

calibrating an initial projection of a predefined 3D model of a target object in the surrounding real-world scene, comprising:
  receiving information of a location of a landmark on the target object in the surrounding real-world scene, wherein the landmark on the target object corresponds to a landmark on the 3D model;
executing an iterative target object pose estimation, comprising:
  estimating an estimated target object pose of the target object in the surrounding real-world scene from each of the optical sensor poses and the location of the landmark on the target object;
  for each of the optical sensor poses, generating an image of interest in which the 3D model is arranged in the estimated target object pose and projected onto the target object in the surrounding real-world scene;
  using each of the images of interest generated, determining one or more 3D data points of the surrounding real-world scene and 3D data points of the projected 3D model in the image of interest using ray-casting and a spatial mapping system;
  calculating a target object pose estimation error from the 3D data points of the surrounding real-world scene and the corresponding 3D data points of the projected 3D model;
  qualifying each of the optical sensor poses;
  calculating a mean of the target object pose estimation errors corresponding to the qualified optical sensor poses; and
  reiterating the iterative target object pose estimation with one or more estimation parameter values adjusted until an optimized estimated target object pose is found that produces a minimum of the target object pose mean estimation error;
comparing the minimum target object pose mean estimation error with a predefined target object pose mean estimation error threshold; and
if the minimum target object pose mean estimation error does not exceed the predefined target object pose mean estimation error threshold, then rendering the AR user manual onto the target object in the electronic 3D viewing environment according to the optimized estimated target object pose and a current optical sensor pose;
else if the minimum target object pose mean estimation error is larger than the predefined target object pose mean estimation error threshold, or if no optical sensor pose is qualified, then the iterative target object pose estimation is considered failure.

2. The method of claim 1, wherein the calibration of the initial projection of the 3D model further comprises:
  displaying to a user the 3D model with an indicator of a landmark as a cue; and
  receiving a user input of the location of the landmark on the target object in the surrounding real-world scene.

3. The method of claim 1, wherein the estimation of the estimated target object pose of the target object in the surrounding real-world scene from each of the optical sensor poses and the location of the landmark on the target object comprises:
  estimating a yaw of the target object; and
  estimating a distance between the optical sensor lens under the optical sensor pose to a center of the target object estimated from the location of the landmark on the target object;

wherein the estimated target object pose is represented by a pitch, the yaw, and a roll of the target object, and the distance between the optical sensor lens to the estimated center of the target object; and
wherein the yaw of the target object and a distance compensation of the distance between the optical sensor lens to the estimated center of the target object being the estimation parameters to be varied in each iteration of the iterative target object pose estimation.

4. The method of claim 1, wherein the generation of the image of interest comprises:
  obtaining the estimated target object pose;
  projecting the 3D model, which is arranged in the estimated target object pose, onto the target object in the surrounding real-world scene;
  fitting an object bounding box around the 3D model-projected target object; and
  extracting an image of interest capturing a view bounded by the object bounding box.

5. The method of claim 1, wherein the determination of the 3D data points of the surrounding real-world scene and the 3D data points of the projected 3D model in the image of interest comprises:
  extracting a model projected mask from an impression of the 3D model-projected target object in the image of interest;
  performing a Ray-cast operation to obtain a hit point of each ray from the optical sensor pose through each pixel in the model projected mask to the 3D model arranged in the guessed pose and superimposed in the surrounding real-world scene to obtain the 3D data points of the projected 3D model, and
  performing a Ray-cast operation to obtain a hit point of a ray from the optical sensor pose through each pixel in the model projected mask to a 3D spatial mapping of the surrounding real-world scene to obtain the 3D data points of the surrounding real-world scene, wherein the 3D spatial mapping is generated by a spatial mapping system.

6. The method of claim 5, wherein the calculation of the target object pose estimation error comprises:
  for each of the pixels, $p_i$ in the model projected mask, calculating a spatial distance between the hit point of the ray from the optical sensor pose through the pixel, $p_i$, to the 3D model and the hit point of the same ray from the optical sensor pose through the pixel, $p_i$, to the 3D spatial mapping of the surrounding real-world scene, wherein the spatial distance is an estimation pixel error of the pixel, $p_i$; and
  calculating a mean of the estimation pixel errors of all of the pixels in the model projected mask, wherein the target object pose estimation error is the mean calculated.

7. The method of claim 5, wherein the qualifying of each of the optical sensor poses comprises:
  extracting a background projected mask from areas between the object bounding box and an impression outline of the 3D model-projected target object in the image of interest;
  determining a background error for qualifying the optical sensor pose, comprising:
    obtaining a distance, k, between the optical sensor lens and a point on the 3D model farthest from the optical sensor lens for the optical sensor pose;
    for each pixel, $b_i$, in the background projected mask, comparing a distance, $d(b_i)$, from the optical sensor lens through the pixel, $b_i$, to the 3D spatial mapping of the surrounding real-world scene with k, and if is d($b_i$) shorter than k, a background error count is incremented; and repeating the comparison and the background error counting for all pixels in the background projected mask; and if the background error count is higher than a background error count threshold, the optical sensor pose obtained from the moving trajectory in the current iteration of the target object pose estimation is considered disqualified and the estimated target object pose obtained based on the disqualified optical sensor pose is discarded.

8. The method of claim 1, wherein the estimation parameters comprise a pitch of the target object, yaw of the target object, roll of the target object, and a distance compensation of a distance between the optical sensor lens to an estimated center of the target object for each of the optical sensor poses; and wherein the pitch of the target object is fixed to 0° or +/−90° during the calibration process, the roll of the target object is fixed to 0° or +/−90° during the calibration process, the yaw of the target object is varied between +90° to −90° in each iteration of iterative target pose estimation and the distance compensation is varied between a configurable length in each iteration of iterative target pose estimation.

9. The method of claim 1, wherein the rendering of the AR user manual onto the target object in the electronic 3D viewing environment comprises:

projecting the AR user manual onto the target object at a point of interest according to the optimized estimated target object pose and the current optical sensor pose; and removing the 3D model projection from the electronic 3D viewing environment.

10. The method of claim 1, further comprising:

providing a content creation user interface for defining the 3D model, the landmark, and a point of interest for rendering the AR user manual;

receiving a 1:1 real object 3D model data using the content creation user interface;

receiving coordinate data of the location of the landmark on the 3D model using the content creation user interface; and receiving coordinate data of a point of interest on the 3D mode using the content creation user interface.

11. An apparatus for generating an augmented reality (AR) user manual in an electronic three-dimensional (3D) viewing environment for viewing a surrounding real-world scene with the AR user manual, comprising:

an optical sensor configured to capture images of the surrounding real-world scene;

a spatial mapping system comprising a depth sensor and a spatial mapping module implementable by one or more processors, the spatial mapping system configured to generate a 3D spatial mapping of the surrounding real-world scene;

a position tracking module implementable by one or more processors and configured to receive orientation data of the optical sensor and generate a moving trajectory of the optical sensor comprising a plurality of optical sensor poses;

a user interface module implementable by one or more processors and configured to execute a calibration of an initial projection of a predefined 3D model of a target object in the surrounding real-world scene, the calibration comprising:

receiving information of a location of a landmark on the target object in the surrounding real-world scene, wherein the landmark on the target object corresponds to a landmark on the 3D model;

a motion recording module implementable by one or more processors and configured to record the moving trajectory an object pose estimation module implementable by one or more processors and configured to:

execute an iterative target object pose estimation, comprising:

estimating an estimated target object pose of the target object in the surrounding real-world scene from each of the optical sensor poses and the location of the landmark on the target object;

for each of the optical sensor poses, generating an image of interest in which the 3D model is arranged in the estimated target object pose and projected onto the target object in the surrounding real-world scene;

using each of the images of interest generated, determining one or more 3D data points of the surrounding real-world scene and 3D data points of the projected 3D model in the image of interest using ray-casting and a spatial mapping system;

calculating a target object estimation error from the 3D data points of the surrounding real-world scene and the corresponding 3D data points of the projected 3D model;

qualifying each of the optical sensor poses calculating a mean of the target object pose estimation errors corresponding to the qualified optical sensor poses; and reiterating the iterative target object pose estimation with one or more estimation parameter values adjusted until an optimized estimated target object pose is found that produces a minimum of the target object pose mean estimation error; and comparing the minimum target object pose mean estimation error with a predefined target object pose mean estimation error threshold; and a rendering module implementable by one or more processors and configured to render the AR user manual onto the target object in the electronic 3D viewing environment according to the optimized estimated target object pose and a current optical sensor pose if the minimum target object pose mean estimation error does not exceed the predefined target object pose mean estimation error threshold.

12. The apparatus of claim 11, wherein the calibration of the initial projection of the 3D model further comprises:

displaying to a user the 3D model with an indicator of a landmark as a cue; and receiving a user input of the location of the landmark on the target object in the surrounding real-world scene.

13. The apparatus of claim 11, wherein the estimation of the estimated target object pose of the target object in the surrounding real-world scene from each of the optical sensor poses and the location of the landmark on the target object comprises:

estimating a yaw of the target object;

estimating a distance between the optical sensor lens under the optical sensor pose to a center of the target object estimated from the location of the landmark on the target object;

wherein the estimated target object pose is represented by a pitch, the yaw, and a roll of the target object, and the distance between the optical sensor lens to the estimated center of the target object; and wherein the yaw of the target object and a distance compensation of the distance between the optical sensor lens to the estimated center of the target object being the estimation parameters to be varied in each iteration of the iterative target object pose estimation.

14. The apparatus of claim 11, wherein the generation of the image of interest comprises:
obtaining the estimated target object pose;
projecting the 3D model, which is arranged in the estimated target object pose, onto the target object in the surrounding real-world scene;
fitting an object bounding box around the 3D model-projected target object; and
extracting an image of interest capturing a view bounded by the object bounding box.

15. The apparatus of claim 11, wherein the determination of the 3D data points of the surrounding real-world scene and the 3D data points of the projected 3D model in the image of interest comprises:
extracting a model projected mask from an impression of the 3D model-projected target object in the image of interest;
performing a Ray-cast operation to obtain a hit point of each ray from the optical sensor pose through each pixel in the model projected mask to the 3D model arranged in the guessed pose and superimposed in the surrounding real-world scene to obtain the 3D data points of the projected 3D model, and
performing a Ray-cast operation to obtain a hit point of a ray from the optical sensor pose through each pixel in the model projected mask to a 3D spatial mapping of the surrounding real-world scene to obtain the 3D data points of the surrounding real-world scene, wherein the 3D spatial mapping is generated by a spatial mapping system.

16. The apparatus of claim 15, wherein the calculation of the target object pose estimation error comprises:
for each of the pixels, $p_i$, in the model projected mask, calculating a spatial distance between the hit point of the ray from the optical sensor pose through the pixel, $p_i$, to the 3D model and the hit point of the same ray from the optical sensor pose through the pixel, $p_i$, to the 3D spatial mapping of the surrounding real-world scene, wherein the spatial distance is an estimation pixel error of the pixel, $p_i$; and
calculating a mean of the estimation pixel errors of all of the pixels in the model projected mask, wherein the target object pose estimation error is the mean calculated.

17. The apparatus of claim 15, wherein the qualifying of each of the optical sensor poses comprises
extracting a background projected mask from areas between the object bounding box and an impression outline of the 3D model-projected target object in the image of interest;

determining a background error for qualifying the optical sensor pose, comprising:
obtaining a distance, k, between the optical sensor lens and a point on the 3D model farthest from the optical sensor lens for the optical sensor pose;
for each pixel, $b_i$, in the background projected mask, comparing a distance, $d(b_i)$, from the optical sensor lens through the pixel, $b_i$, to the 3D spatial mapping of the surrounding real-world scene with k, and if is $d(b_i)$ shorter than k, a background error count is incremented; and repeating the comparison and the background error counting for all pixels in the background projected mask; and
if the background error count is higher than a background error count threshold, the optical sensor pose obtained from the moving trajectory in the current iteration of the target object pose estimation is considered disqualified and the estimated target object pose obtained based on the disqualified optical sensor pose is discarded.

18. The apparatus of claim 11, wherein the estimation parameters comprise a pitch of the target object, yaw of the target object, roll of the target object, and a distance compensation of a distance between the optical sensor lens to an estimated center of the target object for each of the optical sensor poses; and
wherein the pitch of the target object is fixed to 0° or +/−90° during the calibration process, the roll of the target object is fixed to 0° or +/−90° during the calibration process, the yaw of the target object is varied between +90° to −90° in each iteration of iterative target pose estimation and the distance compensation is varied between a configurable length in each iteration of iterative target pose estimation.

19. The apparatus of claim 11, wherein the rendering module is further configured to:
project the AR user manual onto a point of interest on the target object according to the optimized estimated target object pose and the current optical sensor pose; and
remove the 3D model projection from the electronic 3D viewing environment.

20. The apparatus of claim 11, further comprising a content creation user interface for defining the 3D model, the landmark, and a point of interest for rendering the AR user manual, the content creation user interface is configured to:
receive a 1:1 real object 3D model data using the content creation user interface;
receive coordinate data of the location of the landmark on the 3D model using the content creation user interface; and
receive coordinate data of a point of interest on the 3D mode using the content creation user interface.

* * * * *